Figures 1, 2:
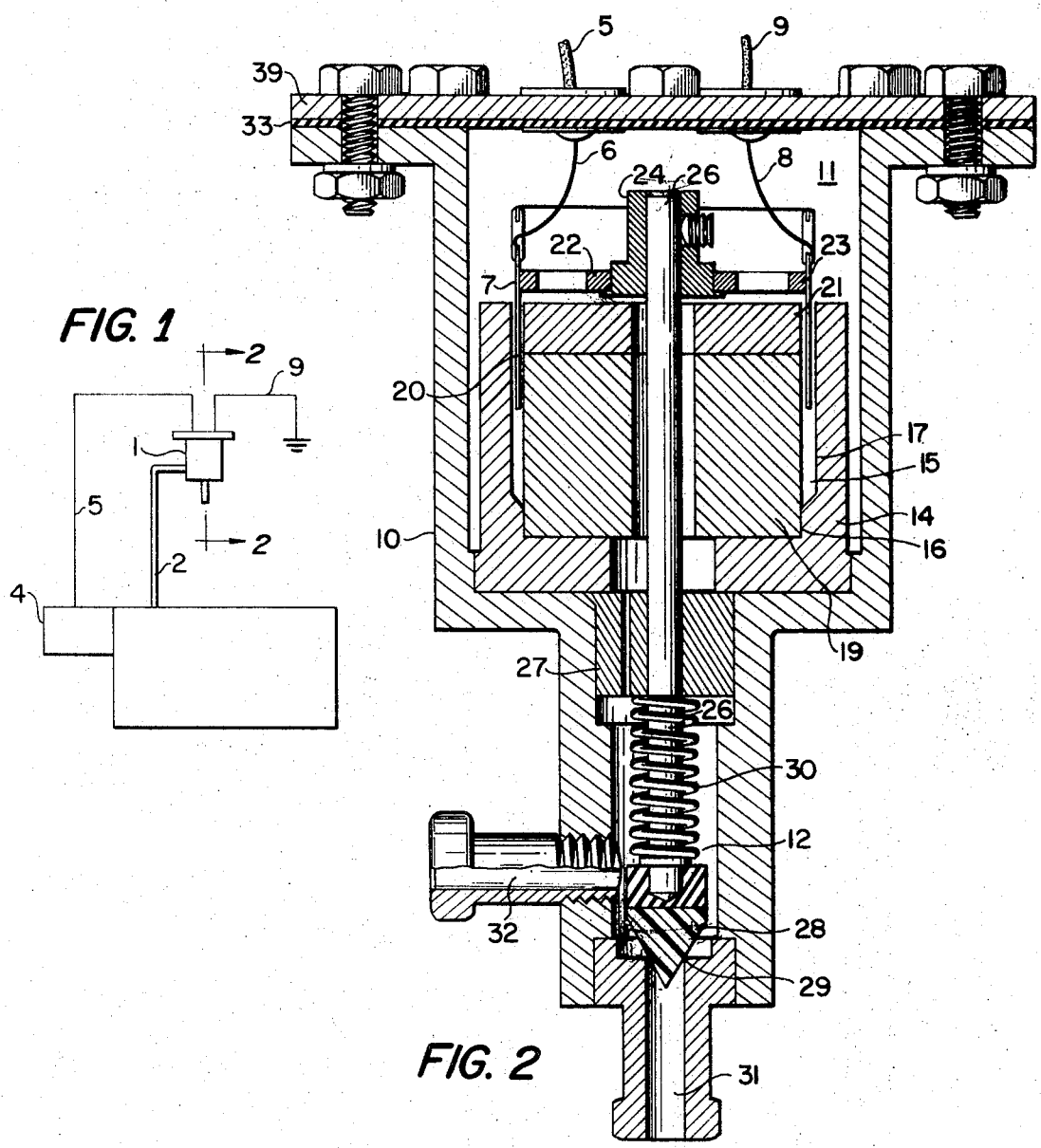

United States Patent [19]

King

[11] 3,842,809

[45] Oct. 22, 1974

[54] FLUID FLOW METERING VALVE FOR INTERNAL COMBUSTION ENGINE

[75] Inventor: John A. King, Mentor, Ohio

[73] Assignee: Cleveland Electronics, Inc., Cleveland, Ohio

[22] Filed: Oct. 3, 1972

[21] Appl. No.: 294,661

[52] U.S. Cl. ............ 123/32 AE, 417/417, 251/129, 137/487 S, 123/139 E
[51] Int. Cl. ... F02b 3/00, F02m 39/00, F16k 31/02
[58] Field of Search.... 123/32 AE, 32 EA; 417/417; 137/487.5, 625.64, 596.17; 251/30, 129, 141

[56] References Cited
UNITED STATES PATENTS

| | | | |
|---|---|---|---|
| 2,920,651 | 1/1960 | Welsh | 251/129 |
| 2,926,691 | 3/1960 | Huff | 251/129 |
| 3,167,094 | 1/1965 | Castelijns | 251/129 |
| 3,171,585 | 3/1965 | Gauss | 417/417 |
| 3,460,520 | 8/1969 | Huber | 123/32 EA |
| 3,592,392 | 7/1971 | Huber | 123/32 AE |
| 3,597,122 | 8/1971 | Farmer | 417/417 |
| 3,621,864 | 11/1971 | Tonegawa | 251/129 |

Primary Examiner—Charles J. Myhre
Assistant Examiner—Ronald B. Cox
Attorney, Agent, or Firm—Abraham A. Saffitz

[57] ABSTRACT

A fuel flow metering valve for a combustion engine that is operated by an electro-dynamic motor. The motor comprises a magnetic means surrounded by a moving coil. A movable valve metering member is connected to the moving coil. The moving coil is connected to a D.C. electric generating means which is responsive to selected conditions of the engine operations. The geometry of the valve and the impressed voltage on the moving coil are so related that a linear proportional relation exists between the rate of fuel flow and the value of the impressed voltage.

1 Claim, 2 Drawing Figures

PATENTED OCT 22 1974  3,842,809

FLUID FLOW METERING VALVE FOR INTERNAL COMBUSTION ENGINE

This invention relates to the metering of fuel flow to a combustion engine by an electrically operated metering valve responsive to select conditions of the engine operation.

In the prior art of fuel metering, electrically operated valves have been used to meter fuel, or time the flow of fuel by making the electrically operated valves responsive to various conditions and parameters of engine operation. Such prior art is represented by U.S. Pats. No. 3,490,425 to Bassot et al; No. 3,616,784 to Barr and No. 2,948,273 to Suttle.

The electrically actuated metering valves of the prior art tend to exert an unsatisfactory metering control since they do not offer a full linear relationship between motion of the movable valve member and the signal voltage impressed on the solenoid means actuating the movable metering valve member.

The object of this invention is to provide an electrically actuated fuel metering valve for conrolling the fuel flow rate exactly proportional to the value of the impressed voltage on the electrical valve actuating means.

The further object is to provide a fuel metering valve actuated by an electro-dynamic motor comprising a movable coil connected to the movable valve member, whereby a linear relationship occurs between fuel flow rate and the impressed voltage across the moving coil.

Other objects of this invention will become apparent from the following description taken in connection with the accompanying drawing of which:

FIG. 1 is a schematic view showing the connections of the fuel metering valve to the combustion engine and to the electrical signal generating means; and FIG. 2 is a sectional view of the valve device taken along line 2—2 of FIG. 1.

Referring to FIG. 1, the fuel flow to an internal combustion engine (ICE) is metered by valve 1. Fuel enters the valve at an inlet and flows in a metered flow to a conducting means 2 which leads to any type fuel serving and mixing means utilized in various engines.

Means 4 is an electrical signal generating means responsive to a selected condition or conditions of engine operations, such as speed, pressures, temperatures etc. In the instant invention it is preferred that means 4 produce a D.C. current.

Signal means 4 is connected to valve 1 by conductor 5, as illustrated in FIG. 2. Conductor 5 is connected by a flexible conductor 6 to moving coil 7 of the electrical valve actuating means. The other end of coil 7 is connected by a flexible conductor 8 to the ground by lead 9.

The valve structure proper comprises a casing 10 having chambers 11 and 12. Chamber 11 houses the electrodynamic valve actuating means and chamber 12 the fuel metering valve means. Chamber 11 has located therein an annular magnet pole piece 14. Pole piece 14 has a concentric stepped cavity 15 therein with small diameter portion 16 adjacent chamber 12 and larger portion 17 extending towards the open end of chamber 11. A cylindrical magnet 19 fits into portion 16 and extends into portion 17. An annular core cap 21 is placed on the magnet within and at the end of portion 17 and forms the working air gap 20, as illustrated in FIG. 2. Moving coil 7 moves within air gap 20 in response to the value of the voltage impressed thereon.

A perforated coil plate 22 is secured at its periphery 23 to moving coil 7 by any conventional means. A hub 24 secured to plate 22 carries a set screw 25 for attaching an armature in the form of a rod 26 to plate 22, whereby movement of coil 7 moves rod 26.

Rod 26 passes through the aligned center bores of means 14, 19 and 21 into chamber 12 and is slidably supported by perforated bearing 27 located as the junction of chambers 11 and 12. The end of rod 26 is connected to movable metering valve member 28 cooperating with a valve seat 29. A preloaded compression spring 30 located between bearing 27 and valve member 28 biases valve 28 onto its seat 29 with a selected biasing force. Valve chamber 12 is provided with ports 31 and 32, either port serving selectively as an inlet or outlet.

The open end of chamber 11 is closed by gasket 32 and end cap 34 which support the connecting terminals of conductors 5 and 9. While there is a pressure drop across 28 at seat 29 when the valve is not widely open, and while there may be a decrease in pressure at outlet 32 compared to the pressures existing within the closed valve casing portion 11, these pressure variations are not substantial. The result is that the pressure forces acting and the effective area of valve means 24 - 26 tending to move the valve upwardly in FIG. 2 are substantially balanced by the pressure in casing 11 acting as top of valve means 26. Thus, the valve means is substantially balanced under the pressure fluid forces acting thereon.

The several parts of the valve assembly are fabricated of suitable materials for handling various fuels and other fluids, in accordance with the usual practice of the magnetic actuated valve art.

In operation the spring biases the valve member to closed position with a selected force. Assuming that port 31 is the inlet, the selected biasing force will maintain the valve closed against the action of the fuel pressure against the effective pressure area of the valve member 28 acting within seat 29 until a desired voltage is impressed on moving coil 7 in the direction to open inlet 31. That voltage represents the electromagnetic force of sufficient value to overcome the selected spring bias and initiate the opening movement of valve member 28. Upon a further rise of impressed voltage on moving coil 7 by signal means 4 an additional valve opening force developes which will produce movement of the valve member with a proportional increase of fuel flow rate between the inlet 31 and outlet 32. The proportional flow will be due to the calculated geometry of the flow path formed by the valve member and its seat on the linear operation of the valve member by the moving coil.

The actual linearity of the motion is a function of the spring rate linearity and the coil-magnetic field linearity. The problems of selecting the proper spring rates and proper magnetic forces are matters of design and calculation well know to those skilled in the art. The proper selection of the spring rate and magnet flux will give a straight line relationship when the impressed voltage on the coil is plotted versus the flow rate through the valve from zero flow to maximum flow.

Although the preferred embodiment of the invention has been described, it is to be clearly understood that

What is claimed is:

1. The combination of a combustion engine having a fuel conduit means, an electric generating means responsive to conditions of engine operations determining rate of fuel flow to the engine for generating a continuous electrical signal proportional to the magnitude of said conditions, and a fuel metering valve in said conduit means; said valve comprising a casing having two portions, one portion having an inlet port and an outlet port, a valve member controlling flow through said portion; an electro-dynamic motor for actuating said valve member located in the other portion, said motor comprising an annular pole piece element, an annular magnetic means element positioned concentrically with said pole piece element and spaced therefrom to form an air gap, and a moving coil located within said air gap; means connecting said valve member to said moving coil, said connecting means being positioned concentrically with said annular pole piece element and magnetic means element and passing through one of said elements; and a conductor means connecting said moving coil to said electric generating means.

* * * * *